J. MELLOR.
METALLIC WIPER.
APPLICATION FILED JAN. 22, 1917.

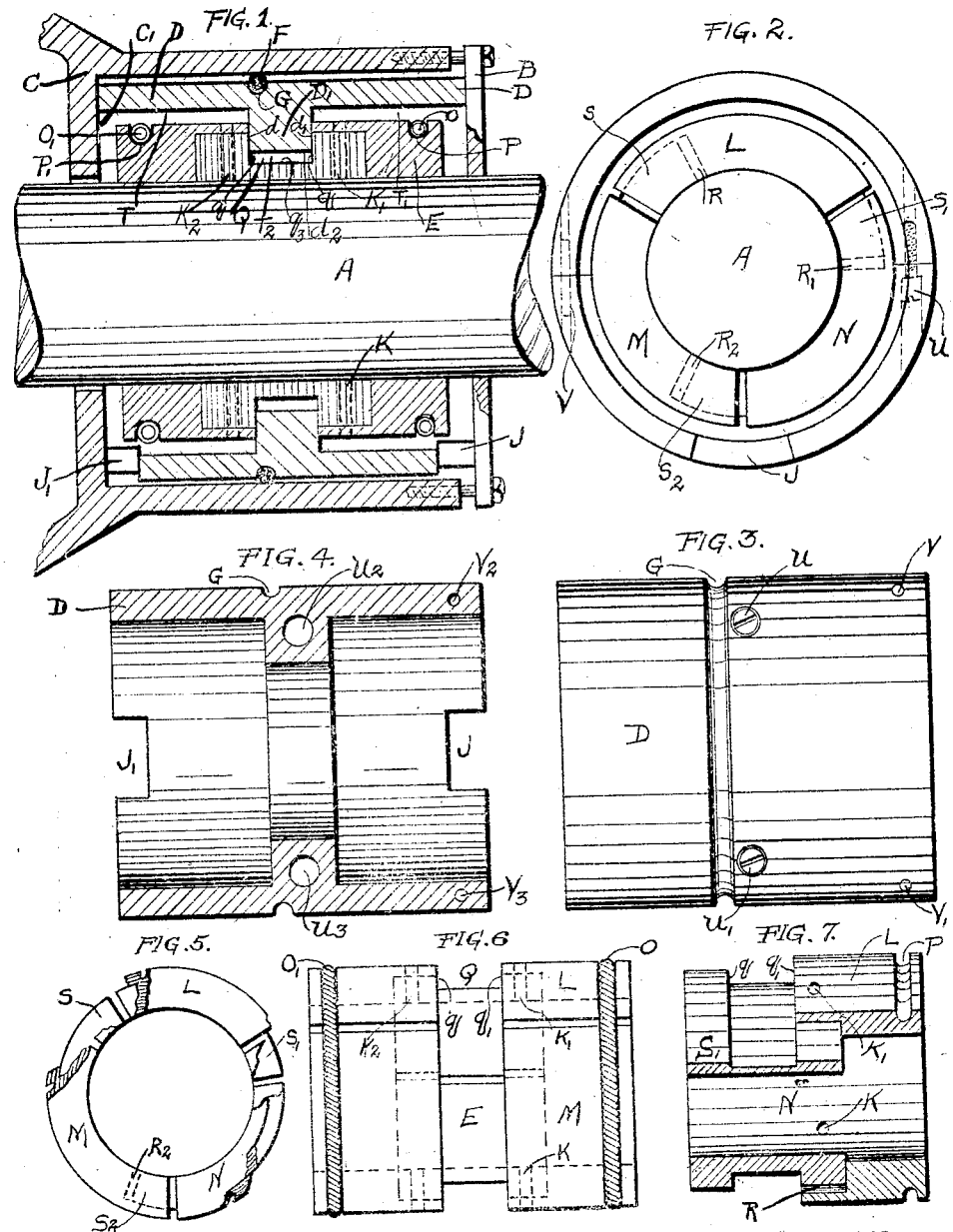

1,381,323.

Patented June 14, 1921.
2 SHEETS—SHEET 2.

WITNESSES:

INVENTOR
John Mellor

UNITED STATES PATENT OFFICE.

JOHN MELLOR, OF JERSEY CITY, NEW JERSEY.

METALLIC WIPER.

1,381,323.

Specification of Letters Patent. Patented June 14, 1921.

Application filed January 22, 1917. Serial No. 143,851.

*To all whom it may concern:*

Be it known that I, JOHN MELLOR, a citizen of the United States, and residing in Jersey City, county of Hudson, and State of New Jersey, have invented new and useful Improvements in Metallic Wipers, of which the following is a specification.

An object of my invention is to produce a metallic wiper for reciprocating members of engines, pumps and similar machinery that will remove water, oil or other liquids from the surface of such reciprocating member during its movements in opposite directions under equal pressure conditions and will, while permitting free reciprocating movement of the rod therethrough, prevent such liquid from traveling or passing along said rod in either direction beyond the position of said wiper and to this end, I provide a casing open at its opposite ends and having an interior projection extending around its inner annular surface, and said casing preferably having suitable drain apertures at opposite sides substantially on the same level as the base of said projection and also a groove in its periphery and a packing strip seated in said groove, in combination with a ring extending to opposite sides of the said inward projection and preferably having contact surfaces on opposite sides of said projection and also preferably having a plurality of grooves contiguous to its opposite ends and at opposite sides of the projection of the casing and springs within said grooves, whereby opposite ends of the ring are balanced and a tilting and unequal wear thereof during movement of the rod in opposite directions is avoided.

A further object of the invention is to provide a casing and rings in such form that, with a fixed casing and an automatically adjustable floating ring, capable of expansion and contraction, compensation will be made for the frequent uneven travel and vibration of a reciprocating member, also there will be a continuous, annular bearing surface of a ring in constant contact with the peripheral surface of a reciprocating member, said contact being secured by tension of springs surrounding a ring in segments.

The nature of my invention will more readily appear by reference to the accompanying drawings, in which, Figure 1 shows the metallic wiper in longitudinal half section, within a corresponding section of a stuffing box or other convenient containing feature of an engine, pump or other machine, with reciprocating member, in place.

Fig. 2 shows an end view of a metallic wiper;

Fig. 3 shows a side view of a metallic wiper;

Fig. 4 shows a half section of a casing;

Fig. 5 shows an end view of a composite ring in part section;

Fig. 6 shows a side view of a ring with springs in place;

Fig. 7 shows a view of a part of composite ring having three segments, one of said segments being omitted;

The several figures are numbered and where similar parts are shown, identical letters of reference have been used.

Figure 8:
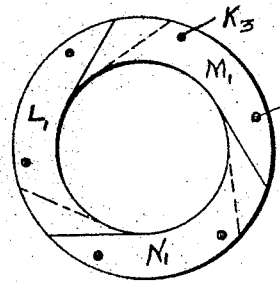
Fig. 8 shows an end view of a ring with modified construction.

In Fig. 1, A represents a reciprocating member and the like, which in practice reciprocates freely in a stuffing box C and through a gland B, neither of which box C or gland B has a bearing contact with the said rod, stem and the like, for the purpose herein named. The casing D is of cylindrical form and on its periphery has an easy sliding fit with the inner annular surface of stuffing box C, said fit being for the ready installation or removal of my wiper. The casing D surrounds the piston rod but has no contact with surface of said rod. Casing D has contact on one end with stuffing box interior surface C1 and on the opposite end said casing forms joint with gland B. The packing strip F is fitted into a groove G and said packing strip F has tight fit between periphery of casing D, in groove G, against the interior wall of stuffing box C. This packing piece F is shown to be located about midway between the ends of said casing D but the groove and said packing piece may be placed otherwise in the periphery of the casing without departing from the intent or scope of my invention. The packing piece may be composed of some soft metal but preferably of fibrous material. The purpose of the packing piece F is to interrupt the passage from one end of said casing, between the casing and the stuffing box, to the other end of the casing, of oil, water or other extraneous matter.

On the inner, annular surface of said casing I provide an annular projection $D_1$ with the surfaces $d$ and $d_1$ in a plane radial to the axis of the casing and an annular surface $d_2$ whose axis is the axis of the casing. The purpose of this projection will be hereinafter stated. Casing D is preferably made in halves, joined by means of screws U and $U_1$ Figs. 2 and 3 or by any other well known means; said screws being applied anywhere in the casing but preferably in the drillings at $U_2$ and $U_3$ as in Fig. 4. Correct registration of the parts of the casing is secured by means of dowel pins $V-V_1$ in Figs 2 and 3, said dowel pins being inserted in openings $V_2-V_3$ Fig. 4.

The casing is provided with openings J Figs. 1, 2 and 4 also $J_1$ Figs. 1 and 4 for the discharge of water, oil and other extraneous matter.

The letter E indicates a ring of preferably built up structure, being composed of preferably three circlets, said circlets being divided into preferably three parts each, then three parts, correspondingly one from each circlet are joined preferably by the use of pins K and $K_1$ Figs. 1 and 7, said union of said parts of circlets effecting a segment of composite ring E. In addition to the use of said pins K and $K_1$ the said circlet parts may be brazed or otherwise sweated together or the latter process may be used exclusively. Under the above preferential divisions ring E contains three segments as indicated by the letters L, M and N as indicated in Figs. 2—5—6 and 7. Said segments are similar in construction having slots $R-R_1$ and $R_2$ at one end and projections $S-S_1$ and $S_2$ respectively in the other end. Each of said slots and projections has preferably two faces of sliding contact in common, the first of said faces radially at angles to the axis of said composite ring, the second of said faces being in a plane at angles to the plane of first of said faces. The projection of one segment, overlaps, fitting into the slot of the correspondingly opposite end of an adjacent segment, effectively breaking joint formed by the abutting adjacent ends of segments of ring E. Ring E has a groove Q with sides $q$ and $q_1$ at angles to the axis of the ring. Said groove has sufficient opening to admit the projection $D_1$ of the casing, which said projection has a snug sliding fit on its sides $d$ and $d_1$ within said groove on the faces $q$ and $q_1$ of the groove. There is a space T and $T_1$ between the periphery of the ring E and the annular inner surface of casing D and also a space $T_2$ between the bottom $q_3$ of groove Q and the annular surface $d_2$ of projection $D_1$ to the end that ring E has freedom radially to the ring axis, to compensate the uneven travel or vibration of a reciprocating member, as frequently obtains in practice.

Figure 9:
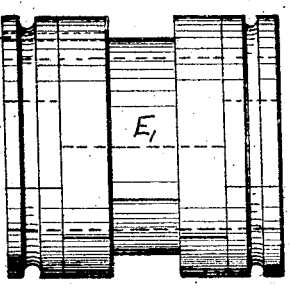
Fig. 9 shows a side view of a ring modified as in Fig. 8.
Figure 10:
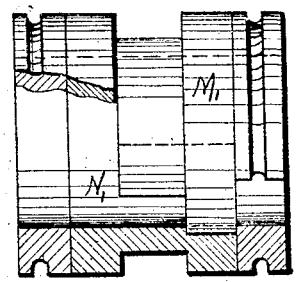
Fig. 10 shows a side view of a modified ring, as in Fig. 8, in part section.

I have designed a modification in the manner of dividing the ring into segments and of breaking joints between adjacent ends of said segments; said modification being made necessary by frequent space limitations of the casing within a stuffing box. In Fig. 8 such modification is shown in an end view of a composite ring in which the circlets are cut tangentially to form segments $L_1-M_1-N_1$ and said circlets are assembled so that joint of composite ring has the joints between segments of compound circlets offset, thereby effectively breaking joint between ends of segments of composite ring. Fig. 9 shows a side view in modified ring $E_1$ in which the construction is identical with my ring as described in Fig. 6 with a modification in the method of dividing the circlet and the form of joint in the overlapping ends of composite ring segments. In Fig. 10 a side view of modified ring partly in section shows the construction of the segmental end in a sectional view through the wall of the ring.

By means of the above invention, water, oil and other extraneous matter, traveling in any direction with a rod or in space immediately surrounding said rod, is interrupted and is discharged from the rod.

Various minor modifications may be made in the above invention without departing from the invention as herein claimed.

Having thus described my invention, what I claim and desire to secure by Letters Patent is:—

1. In a metallic wiper, the combination with a rod and stuffing box, of a casing arranged in fixed position within said stuffing box and surrounding but out of contact with the rod, said casing having an inward projection on its inner annular surface, and a ring within said casing extending between said projection and the rod and having its inner surface contacting with the rod and having on its outer surface a groove, the walls of which have a sliding contact with the walls of said projection.

2. In a metallic wiper, the combination with a rod and stuffing box, of a casing arranged in fixed position within said stuffing box and surrounding but out of contact with the rod, said casing being open at its opposite ends and having a single inward projection on its inner annular surface and a ring within said casing extending between said projection and the rod and having its inner surface contacting with the rod and having on its outer surface a groove, the walls of which have a sliding contact with the walls of said projection.

3. In a metallic wiper, the combination with a rod and stuffing box, of a casing fixed within said stuffing box and surrounding but out of contact with the rod, said casing being open at its opposite ends and having a single inward projection on its inner annular surface, and a ring within said casing composed of segments and extending between said projection and the rod and having its inner surface contacting with the rod and having on its outer surface a groove, the walls of which have a sliding contact with the walls of said projection and said ring being provided with encircling springs for applying pressure to said ring on opposite sides of said projection.

4. In a metallic wiper, the combination with a rod and stuffing box, of a casing fixed within said stuffing box and surrounding but out of contact with the rod, said casing being open at its opposite ends and having a single inward projection on its inner annular surface, and a ring within the casing composed of segments each extending horizontally to opposite sides of said projection and said ring being provided with encircling springs for applying pressure to said ring on opposite sides of said projection and contiguous to opposite ends thereof.

5. In a metallic wiper, the combination with a rod and stuffing box, of a casing fixed within said stuffing box and surrounding but out of contact with the rod, said casing being open at its opposite ends and having a single inward projection on its inner annular surface, drain apertures substantially flush with the base of said projection and at opposite sides thereof, and a contractible segmental wiping means seated within said casing and bearing on the said rod horizontally and having substantially vertical bearing surfaces on the casing at opposite sides of the projection.

Signed at New York, county and State of New York, this 15 day of January, 1917.

JOHN MELLOR.